United States Patent
Min et al.

(10) Patent No.: US 7,502,305 B2
(45) Date of Patent: Mar. 10, 2009

(54) DATA STORAGE DEVICE AND METHOD OF TRACKING DATA STORED IN THE SAME

(75) Inventors: Dong-ki Min, Seoul (KR); Seung-bum Hong, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 798 days.

(21) Appl. No.: 10/994,281

(22) Filed: Nov. 23, 2004

(65) Prior Publication Data
US 2005/0111313 A1      May 26, 2005

(30) Foreign Application Priority Data
Nov. 24, 2003     (KR) ............... 10-2003-0083615

(51) Int. Cl.
*G11B 9/00* (2006.01)
(52) U.S. Cl. ....................... 369/126
(58) Field of Classification Search ......... None
See application file for complete search history.

(56) References Cited

U.S. PATENT DOCUMENTS

| | | | | |
|---|---|---|---|---|
| 5,053,995 A | * | 10/1991 | Kajimura et al. | 369/126 |
| 5,299,184 A | * | 3/1994 | Yamano et al. | 369/44.28 |
| 5,446,720 A | * | 8/1995 | Oguchi et al. | 369/126 |
| 5,502,710 A | * | 3/1996 | Washizawa et al. | 369/126 |
| 5,506,829 A | * | 4/1996 | Yagi et al. | 369/126 |
| 5,835,477 A | * | 11/1998 | Binnig et al. | 369/126 |
| 6,195,313 B1 | | 2/2001 | Seki et al. | |
| 2005/0007900 A1 | * | 1/2005 | Min et al. | 369/44.26 |

FOREIGN PATENT DOCUMENTS

| | | |
|---|---|---|
| EP | 0 441 399 A2 | 8/1991 |
| EP | 0 726 566 A2 | 8/1996 |
| JP | 1-154332 A | 6/1989 |
| JP | 8-287533 A | 11/1996 |
| JP | 11096607 A | 4/1999 |

* cited by examiner

*Primary Examiner*—Joseph H Feild
*Assistant Examiner*—Nathan Danielsen
(74) *Attorney, Agent, or Firm*—Sughrue Mion, PLLC

(57) ABSTRACT

Provided are a data storage device and a method of tracking data stored in the data storage device. The device includes a data storage medium on which data can be recorded and erased, a plurality of probes for scanning the data storage medium to detect data, a scanner for driving the data storage medium or the probes, and a controller for applying a control signal to the scanner. The method includes (a) oscillating the probe or the data storage medium; (b) detecting an off-track error of the probe on the data storage medium by the oscillation; and (c) adjusting a scanning position of the probe on the data storage medium to compensate for the off-track error.

7 Claims, 5 Drawing Sheets

DATA STORAGE DEVICE AND METHOD OF TRACKING DATA STORED IN THE SAME

This application claims the priority of Korean Patent Application No. 2003-83615, filed on Nov. 24, 2003, in the Korean Intellectual Property Office, the disclosure of which is incorporated herein in its entirety by reference.

BACKGROUND OF THE INVENTION

1. Field of the Invention

The present invention relates to a data storage device and a method of tracking data stored in the data storage device, and more particularly, to a method of finely tracking a position of data recorded in a data storage medium using scanning probe microscopy (SPM) technology.

2. Description of the Related Art

Generally, a high-density data storage device using SPM technology includes a data storage medium, a probe, an x-y stage, a controller, and a signal processor. Data can be stored in or erased from the data storage medium. The probe includes a tip for recording or reproducing data and a cantilever on which the tip is mounted. The x-y stage moves the data storage medium, and the controller issues commands to control the data storage device. To record or reproduce high-density data, a method of tracking data with high precision is required.

Three different types of conventional methods of tracking a position of data have been employed to record data on or reproduce data from such a high-density data storage device using SPM technology.

First, the position of data can be tracked using a mechanical or electric signal of a data storage medium by distinguishing a signal of recorded data from a signal of reproduced data. This method is proposed in U.S. Pat. Nos. 5,132,934, 5,396,483, 5,856,967, and 6,370,107. The foregoing patents disclose a method of forming metal patterns or mechanical grooves on a data storage medium, but it is difficult to form sufficiently fine patterns or grooves on the data storage medium. Also, since the mechanical grooves themselves serve as a mechanism for recording and reproducing data, the practical applications of this method are limited.

Second, there is a method of modulating a central position of data recorded in a data storage medium by oscillating a probe or the data storage medium, as disclosed in U.S. Pat. No. 5,404,349. This method is based on a principle of modulation and demodulation by oscillating the data storage medium in a high frequency range. However, it is difficult to oscillate the data storage medium in the high frequency range. In addition, a circuit for detecting the oscillation of the data storage medium becomes complicated and detection is delayed owing to the principle of modulation and demodulation.

Third, a method of using a central position of data stored in a data storage medium and a relative displacement of a probe for recording or detecting the data is disclosed in U.S. Pat. Nos. 5,202,879 and 6,195,313, for example. Unfortunately, this method necessarily requires very precise recording of data patterns in the data storage medium. In particular, the method proposed in U.S. Pat. No. 5,202,879 cannot serially track data. Accordingly, the data can only be tracked at a relatively low speed. Thus, a data tracking process becomes very sensitive to the external environment.

SUMMARY OF THE INVENTION

The present invention provides a data storage device and a method of tracking data stored in the data storage device. The method can serially detect off-track errors of data in a data storage medium using a tip of a probe for recording or reproducing data, and compensate for the off-track errors through a simple compensation algorithm without the need of precise patterns.

According to an aspect of the present invention, there is provided a method of tracking data stored in a data storage device comprising a data storage medium on which data can be recorded and erased, a plurality of probes for scanning the data storage medium to detect data, a scanner for driving the data storage medium or the probes, and a controller for applying a control signal to the scanner. The method includes (a) oscillating the probe or the data storage medium; (b) detecting an off-track error of the probe on the data storage medium by the oscillation; and (c) adjusting a scanning position of the probe on the data storage medium to compensate for any off-track error.

In operation (a), the probe or the data storage medium may be oscillated according to a low-frequency generated by the controller.

Operation (b) may include detecting data stored on the data storage medium using the probe; generating a signal synchronized with a data position pattern of the data storage medium; and detecting an off-track error of the probe using the synchronized signal.

Operation (c) may include shifting a direct current level of a low-frequency signal in the controller based on a detected off-track error and applying the shifted low-frequency signal to the scanner to drive the probe.

According to another aspect of the present invention, there is provided a data storage device comprising a data storage medium on which data can be recorded and erased, a plurality of probes for scanning the data storage medium to detect data, a scanner for driving the probes, and a controller for controlling the scanner. Herein, the controller includes a synchronizer, which generates a signal synchronized with a data pattern of the data storage medium that is detected by one of the probes; an off-track detector, which detects an off-track error of the probe using the data pattern and the synchronized signal; a compensator, which transmits a value that is compensated for the off-track error detected by the off-track detector to the scanner; and an oscillation signal generator, which applies an oscillation signal to the scanner.

The data storage device may further include an interruption generator, which is connected to the synchronizer and controls operational timing of the oscillation signal generator and the off-track detector.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1A:
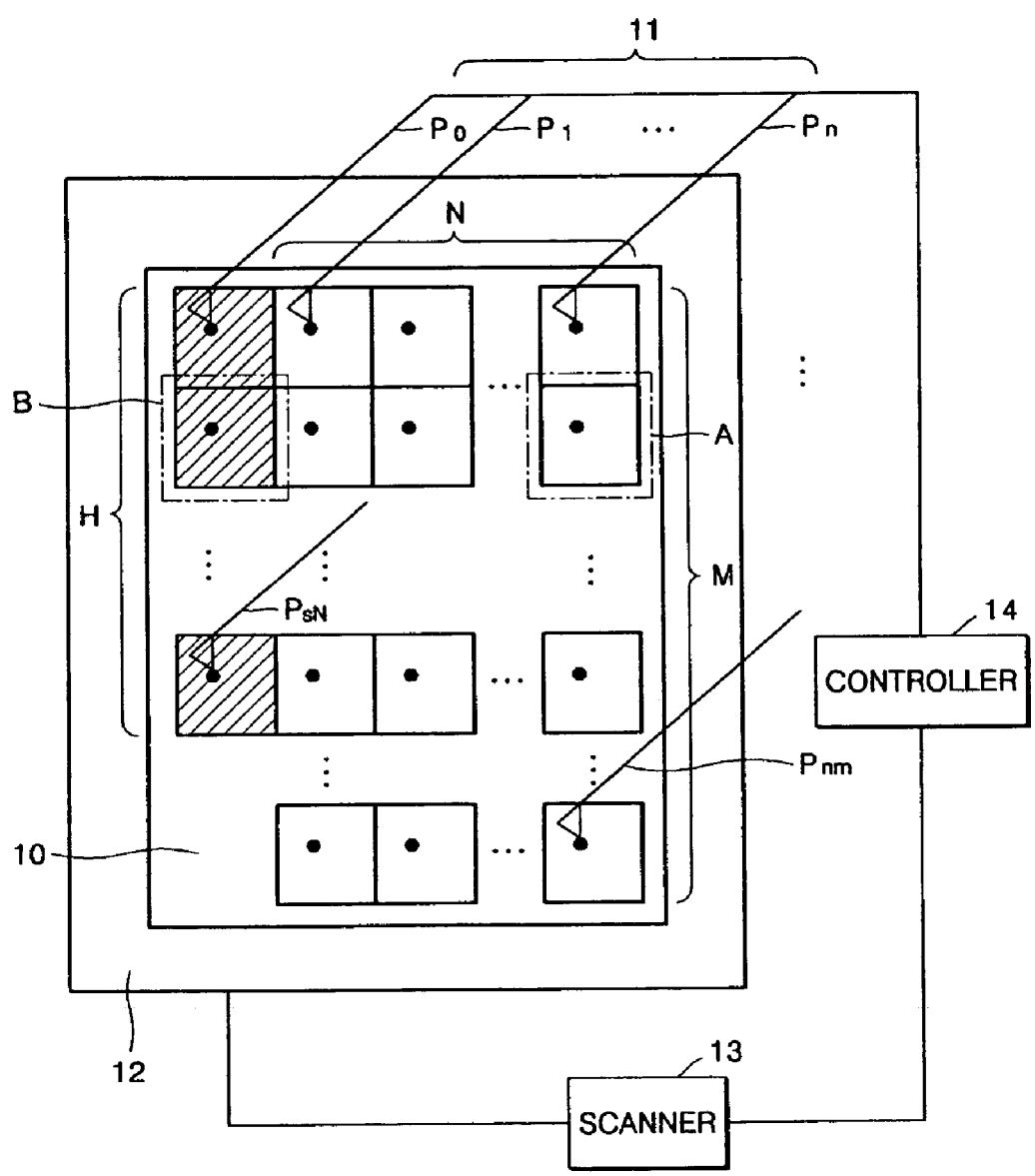
FIG. 1A shows a data storage device.

FIG. 1A shows an example of a data storage device. Referring to FIG. 1A, the data storage device includes a data storage medium 10 and probes 11. The data storage medium 10 stores data, and each of the probes 11 is disposed near the data storage medium 10 and includes a tip for recording and reading data. The data storage medium 10 is positioned on a stage 12 which is driven by a scanner 13 that receives a signal from a controller 14. Here, the scanner 13 may drive the probes 11 instead of the stage 12 to record to or reproduce data from the data storage medium 10.

The data storage medium 10 is divided into N×M data regions A on which data can be recorded and H servo regions B which store information on positions of the data regions A. N×M probes 11 are provided in the data regions A, respectively, and H probes 11 are provided in the servo regions B, respectively. Generally, each of the probes 11 includes the tip (11a of FIG. 3), which is in contact with a recording surface or is spaced a predetermined distance apart from the recording surface, and a cantilever (11b of FIG. 3) for supporting the tip.

Figure 1B:
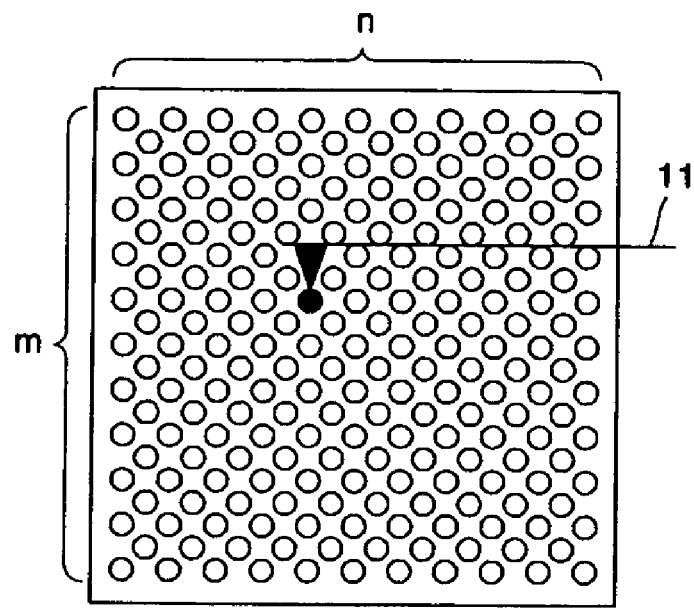
FIGS. 1B and 1C show a data region and a servo region, respectively, of the data storage device of FIG. 1A.
Figure 1C:
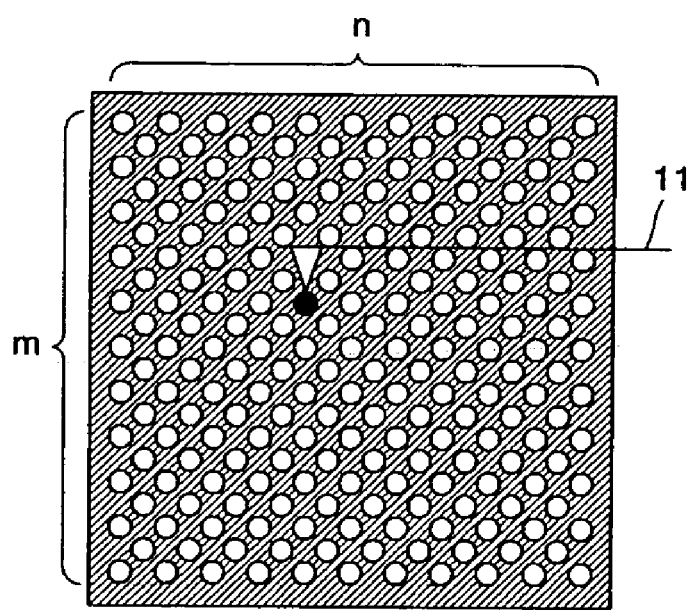

FIG. 1B shows the data region A of FIG. 1A, and FIG. 1C shows the servo region B of FIG. 1A. Referring to FIG. 1B, the data region A includes n×m data unit cells. Referring to FIG. 1C, the servo region B includes n×m servo unit cells. A probe 11 moves over the data unit cells and the servo unit cells to read from or record data to the respective unit cells.

Figure 1D:
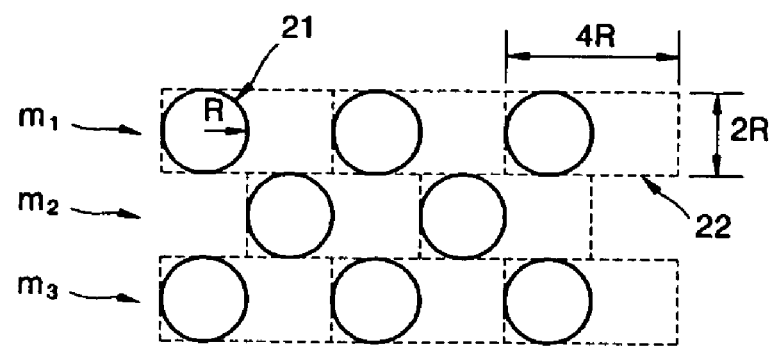
FIG. 1D is a partial view of data bits in data or servo unit cells.

FIG. 1D is a partial view of the data or servo unit cells. Referring to FIG. 1D, a unit cell 22 includes data bits "0" or "1" 21, each of which has a radius R. It is assumed that the unit cell 22 has a length of 4R and a width of 2R. FIG. 1D shows a set of unit cells 22 in 3 rows ($m_1$, $m_2$, and $m_3$). Here, data bits 21 in adjacent rows ($m_1$ and $m_2$ or $m_2$ and $m_3$) have a phase difference of 180°.

Figure 2:
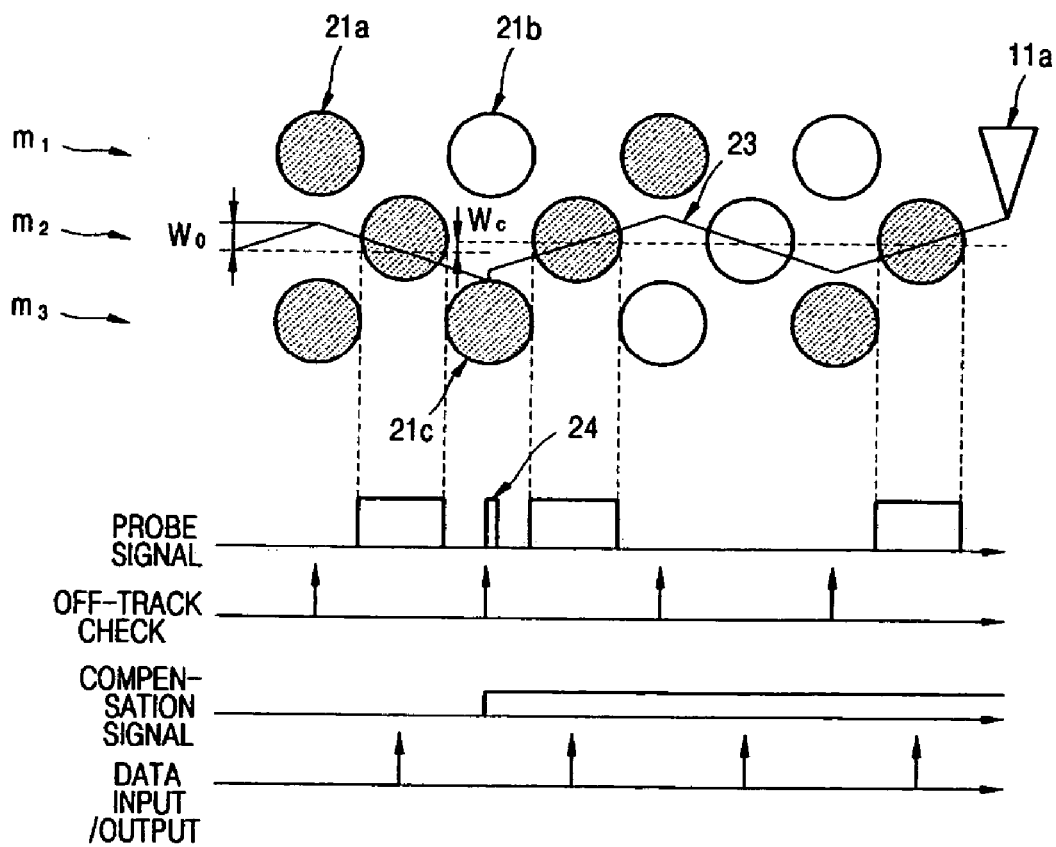
FIG. 2 illustrates a method of tracking data stored in a data storage device according to the present invention.

Hereinafter, a method of tracking data stored in a data storage device according to an embodiment of the present invention will be described in detail with reference to FIG. 2. FIG. 2 illustrates a method of tracking data stored in a data storage device according to the present invention.

FIG. 2 also shows the data bits 21 in 3 rows ($m_1$, $m_2$, and $m_3$) included in the data or servo unit cells 22 as shown in FIG. 1D. The tip 11a of the probe 11 positioned on each of the data regions A and the servo regions B scans the data or servo unit cells 22 in the rows ($m_1$, $m_2$, and $m_3$) to record or reproduce data. A data bit "0" or "1" is recorded on the unit cell 22 in accordance with a certain rule. Reference character 21a (shaded) denotes a data bit "1" and reference character 21b (unshaded) denotes a data bit "0".

The tip 11a of the probe 11 scans data bits in the direction of row $m_2$. In spite of an external environment, the tip 11a oscillates and scans the data bits in the row $m_2$ between the upper and lower rows $m_1$ and $m_3$ to precisely track data. Here, to oscillate the tip 11a with respect to the data storage medium 10, the data storage medium 10 may be oscillated using the scanner 13 of FIG. 1A, or the probe 11 may be oscillated on its own. That is, the controller 14 transmits a signal to the scanner 13 such that the data storage medium 10 or the probe 11 is oscillated at a low frequency. Actually, initial oscillation of the tip 11a is equal to the sum of the low-frequency oscillation driven by the scanner 13 and oscillatory motion resulting from external disturbance of the data storage device. As shown in FIG. 2, the cycle of a scanning wave of the tip 11a is 8 R, i.e., 8 times the radius R of the data bit 21. The cycle and amplitude of oscillation of the tip 11a can be changed according to specific characteristics of the data storage medium 10 and the probe 11.

As shown in FIG. 2, when the tip 11a scans data bits "1", a probe signal is detected by the tip 11a. Here, the tip 11a may cross over into the lower row $m_3$ due to an external disturbance. Thus, off-track signal 24 is detected from the probe signal. If the off-track signal 24 is detected, the controller 14 adds a compensation signal to the probe signal. Here, the magnitude of the off-track signal 24 varies according to the displacement of the tip 11a, and a compensation signal having a predetermined magnitude is applied to the data storage medium 10 or the probe 11 through the scanner 13 in consideration of the magnitude of the off-track signal 24. It can be confirmed from the probe signal of FIG. 2 that a compensation signal is applied from a position where the off-track signal 24 is detected. Accordingly, from this moment on, the oscillation (W) 23 of the tip 11a becomes equal to the sum of a chopping wave with magnitude $W_o$ and a compensation signal with magnitude $W_c$. Here, an off-track check region is in a position of data bits in the upper and lower rows $m_1$ an $m_2$, in a direction in which the tip 11a scans data bits in the row $m_2$. A scan position of the tip 11a is moved upward by the compensation signal with magnitude $W_c$.

Likewise, if the tip 11a crosses over into the upper row $m_1$ due to an external disturbance during scanning of the row $m_2$, the same process described above is performed. Specifically, data recorded in the data bit 21 is detected using the tip 11a while scanning row $m_2$. Here, if the tip 11a scans a data bit in row mi above row $m_2$, information regarding the size of the violated region can be determined from the probe signal. Thus, based on the information from the incursion, the controller 14 applies a compensation signal for the off-track signal to the data storage medium 10 or the probe 11. In response to the compensation signal, the scanner 13 reduces an oscillation position of the data storage medium 10 or the probe 11. In summary, at the outset, the probe 11 or the data storage medium 10 is oscillated, an off-track error of the probe 11 or the data storage medium 10 is detected from the oscillation, and, if necessary, compensation of the scan position of the probe 11 is provided by the scanner 13 based on the off-track error.

Figure 3:
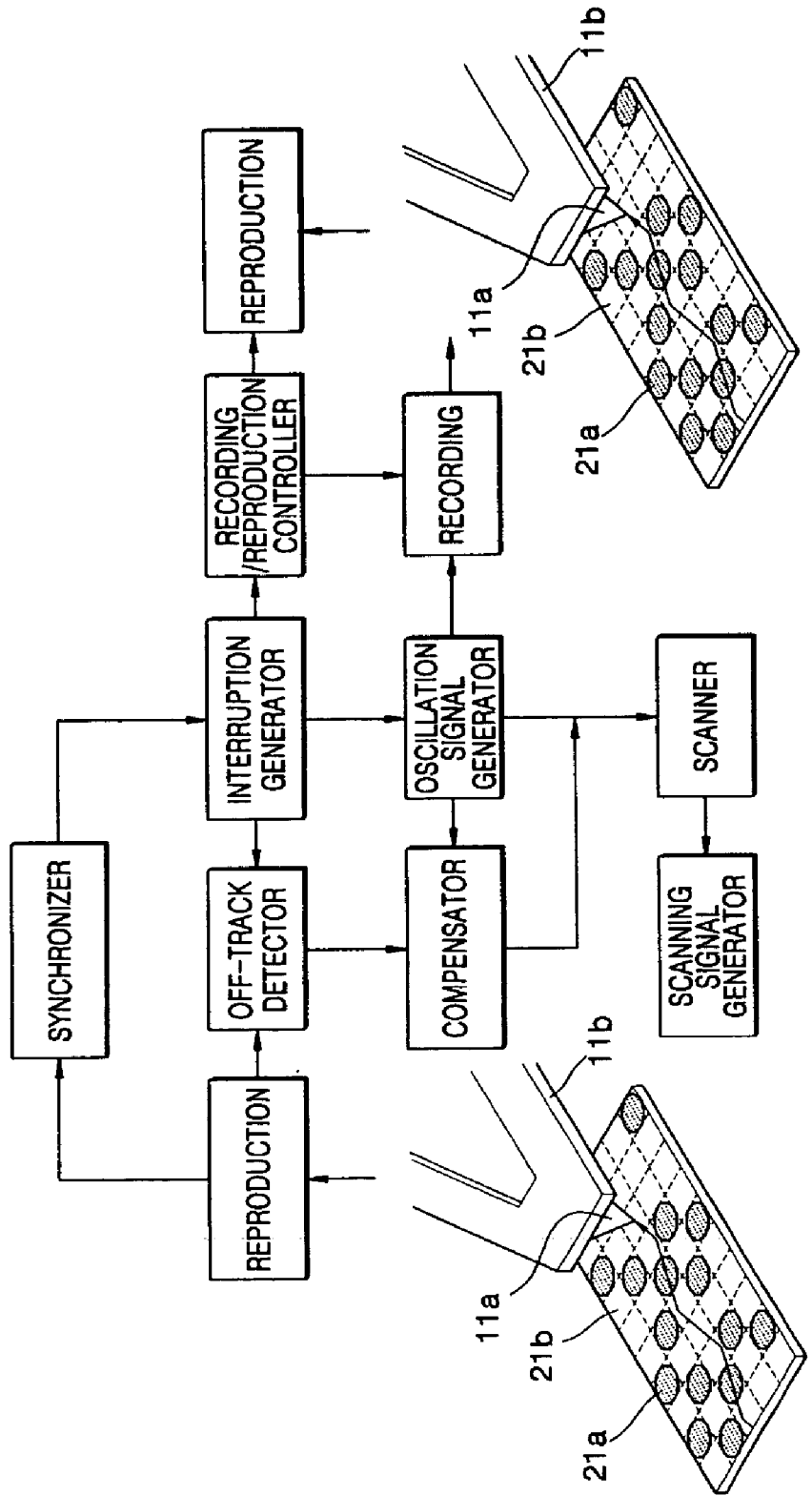
FIG. 3 shows a detailed construction of the data storage device of FIG. 1A.

The data storage device (especially, the controller 14) will be described in detail with reference to FIG. 3, which shows a detailed construction of the data storage device of FIG. 1. In a left servo region, the tip 11a attached to the cantilever 11b of the probe 11 can scan and reproduce data bits "1" (shaded) 21a in a row direction. Also, in a right data region, the tip 11a attached to the cantilever 11b of the probe 11 can scan and reproduce data bits "0" (unshaded) 21b in a row direction. To record or reproduce data, a scanning signal generator generates a signal and outputs the signal to a scanner to drive the data storage medium 10 or the probe 11. Here, the same displacement occurs between a probe in the servo region and a probe in the data region.

If data in the left servo region is reproduced (or detected), a synchronizer generates a signal which is synchronized with the patterns of the data and transmits the generated signal to an interruption generator. In response to the generated signal, operational timings of an off-track detector, an oscillation signal generator, and a recording/reproduction controller are controlled. That is, if the off-track detector detects any off-track error of the tip 11a, a compensator shifts a direct current (DC) level of a low-frequency oscillation signal and applies the shifted low-frequency oscillation signal to the scanner 13. Here, the oscillation signal generator applies a signal along with the low-frequency oscillation signal to the scanner 13, thereby varying the oscillation range of the tip 11a. As a result, the probe 11, which scans the data region, enables the recording/reproduction controller to record and reproduce data in the data region.

Figure 4:
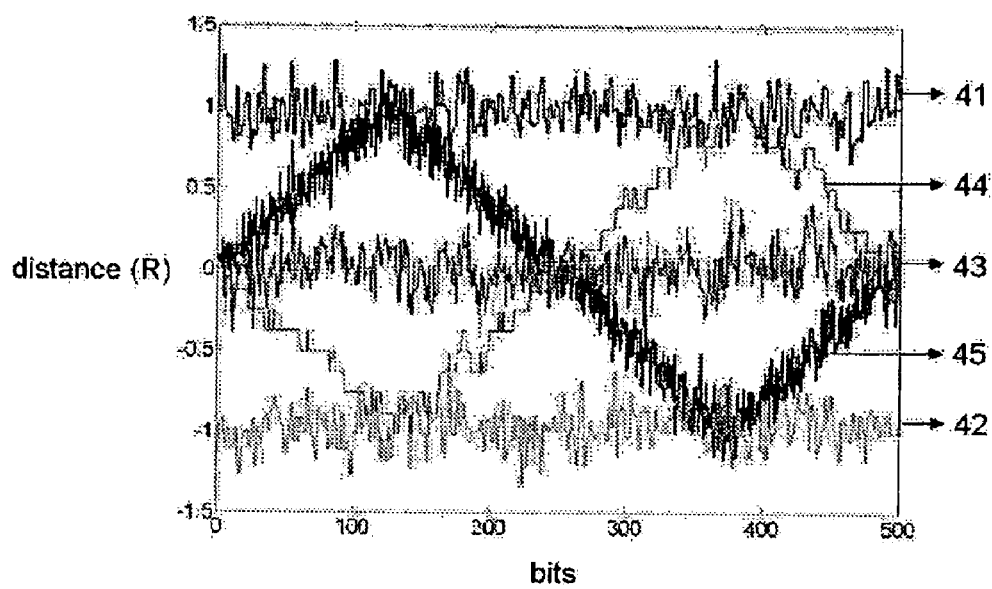
FIG. 4 shows a waveform obtained when a probe scans data bits to record data on or reproduce data from a data storage medium using the data tracking method according to the present invention.

FIG. 4 shows a waveform obtained when a probe scans data bits to record or reproduce data on a data storage medium using the data tracking method according to the present invention. Referring to FIGS. 2 and 4, in the absence of a compensation signal (refer to reference numeral 45), the tip 11a oscillates over data bit 21 in the row $m_2$ due to external disturbances. Here tip 11a sometimes scans beyond the radius R of the data bit 21. That is, the tip 11a crosses over to the data bits in the upper row $m_1$ (refer to 41) and the lower row $m_3$ (refer to 42). In this case, a scanning process of the tip 11a can be adjusted by adding a compensation signal (refer to 44) to the probe signal so that the tip 11a scans nearer to the center of the data bits in the row $m_2$.

The present invention can serially detect off-track errors of data in a data storage medium using a tip of a probe for recording or reproducing data, and compensate for off-track errors through a simple compensation algorithm without the need for precise patterns. Consequently, data can be reliably recorded on and reproduced from the data storage medium.

What is claimed is:

1. A method of tracking data stored in a data storage device comprising a data storage medium on which data can be recorded and erased, a plurality of probes for scanning the data storage medium to detect data, a scanner for driving the data storage medium or the plurality of probes, and a controller for applying a control signal to the scanner, the method comprising:
   (a) oscillating a probe of the plurality of probes on the data storage medium;
   (b) generating a signal synchronized with a data position pattern of the data storage medium;
   (c) detecting an off-track error of the probe of the plurality of probes with respect to the data storage medium using the synchronized signal; and
   (d) adjusting a scanning position of the probe of the plurality of probes with respect to the data storage medium to compensate for the off-track error.

2. The method of claim 1, wherein in operation (a), the probe of the plurality of probes or the data storage medium is oscillated according to a low-frequency signal generated by the controller.

3. The method of claim 1, wherein operation (c) comprises:
   detecting data stored on the data storage medium using the probe of the plurality of probes.

4. The method of claim 3, wherein operation (d) comprises shifting a direct current level of a low-frequency signal in the controller based on the detected off-track error and applying the shifted low-frequency signal to the scanner for driving plurality of probes.

5. The method of claim 1, wherein operation (d) comprises controlling operational timing of the control signal and the off-track error detection.

6. A data storage device comprising a data storage medium on which data can be recorded and erased, a plurality of probes for scanning the data storage medium to detect data, a scanner for driving the plurality of probes, and a controller for controlling the scanner, wherein the controller comprises:
   a synchronizer for generating a signal which is synchronized with a data position pattern of the data storage medium that is detected by a probe of the plurality of probes;
   an off-track detector, which detects an off-track error of the probe of the plurality of probes using date position pattern the and the synchronized signal;
   a compensator, which determines a compensation signal to compensate for the off-track error detected by the off-track detector and transmits the compensation signal to the scanner; and
   an oscillation signal generator, which provides an oscillation signal to the scanner.

7. The data storage device of claim 6, further comprising:
   an interruption generator, which is connected to the synchronizer and controls operational timing of the oscillation signal generator and the off-track detector.

* * * * *